Feb. 23, 1954

D. G. HARTWEG 2,669,872

DETECTION OF FLUID MOVEMENT IN WELLS

Filed June 17, 1952

INVENTOR
Dale G. Hartweg

BY
Griswold & Burdick
ATTORNEYS

Feb. 23, 1954

D. G. HARTWEG 2,669,872

DETECTION OF FLUID MOVEMENT IN WELLS

Filed June 17, 1952

INVENTOR
Dale G. Hartweg

BY
Griswold & Burdick
ATTORNEYS

Patented Feb. 23, 1954

2,669,872

UNITED STATES PATENT OFFICE 2,669,872

DETECTION OF FLUID MOVEMENT IN WELLS

Dale G. Hartweg, Tulsa, Okla., assignor to The Dow Chemical Company, Midland, Mich., a corporation of Delaware Application June 17, 1952, Serial No. 293,961

3 Claims. (Cl. 73—155)

The invention relates to apparatus for sensing the motion of a fluid particularly in a well hole. It more particularly concerns an apparatus for ascertaining in a well bore the elevation at which a fluid therein is moving into or out of an earth zone traversed by the well bore.

In drilling and operating wells in the earth such as oil and gas wells and wells drilled for disposal or storage purposes, it is oftentimes desirable to ascertain the depth at which an earth zone or stratum exists that either absorbs fluid from the well or discharges fluid into the well. Earth zones which absorb fluid from the well hole are generally referred to as thief zones and it is in ascertaining the location of these that the apparatus finds its greatest usefulness. Locating such zones is effected with the apparatus by sensing and comparing fluid movement in the well hole at various depths and ascertaining the depth or level at which the fluid movement shows pronounced changes.

For sensing fluid movement, there is suspended in the fluid on a cable having a single insulated conductor in a balanced electrical circuit, a pair of electrically heated thermally sensitive resistance elements, the resistivity of one of which changes at a greater rate than that of the other with a change in temperature brought about by movement of fluid in contact with the resistance elements. Means are provided above ground for supplying to each of the thermally sensitive resistance elements alternately one of the half-waves, respectively, of an A. C., as the heating current, through the insulated conductor and detecting a difference in the resistance of these resistance elements, as a result of movement of fluid in contact with them, as an unbalance in the said balanced circuit.

Insofar as I am aware, no apparatus heretofore available has fully met the problem of locating fluid movement in earth wells. Accordingly, the principal object of the invention is to provide an apparatus fulfilling this need. This and other objects will become apparent as the description of the invention proceeds. In connection with the description, reference is made to the accompanying drawing illustrating by way of example various embodiments of the invention including a preferred embodiment.

Referring to the drawing, Fig. 1 shows the complete apparatus partly in diagrammatic form with an embodiment of the subsurface portion of the apparatus largely in section suspended by the cable in the bore of a well, in position to detect or sense fluid movement, and the above-ground portion of the apparatus which includes the source of electricity and provides the indications of fluid movement and the depth at which the indications of the movement are obtained.

In the various figures, like numerals designate like parts.

Figure 1:
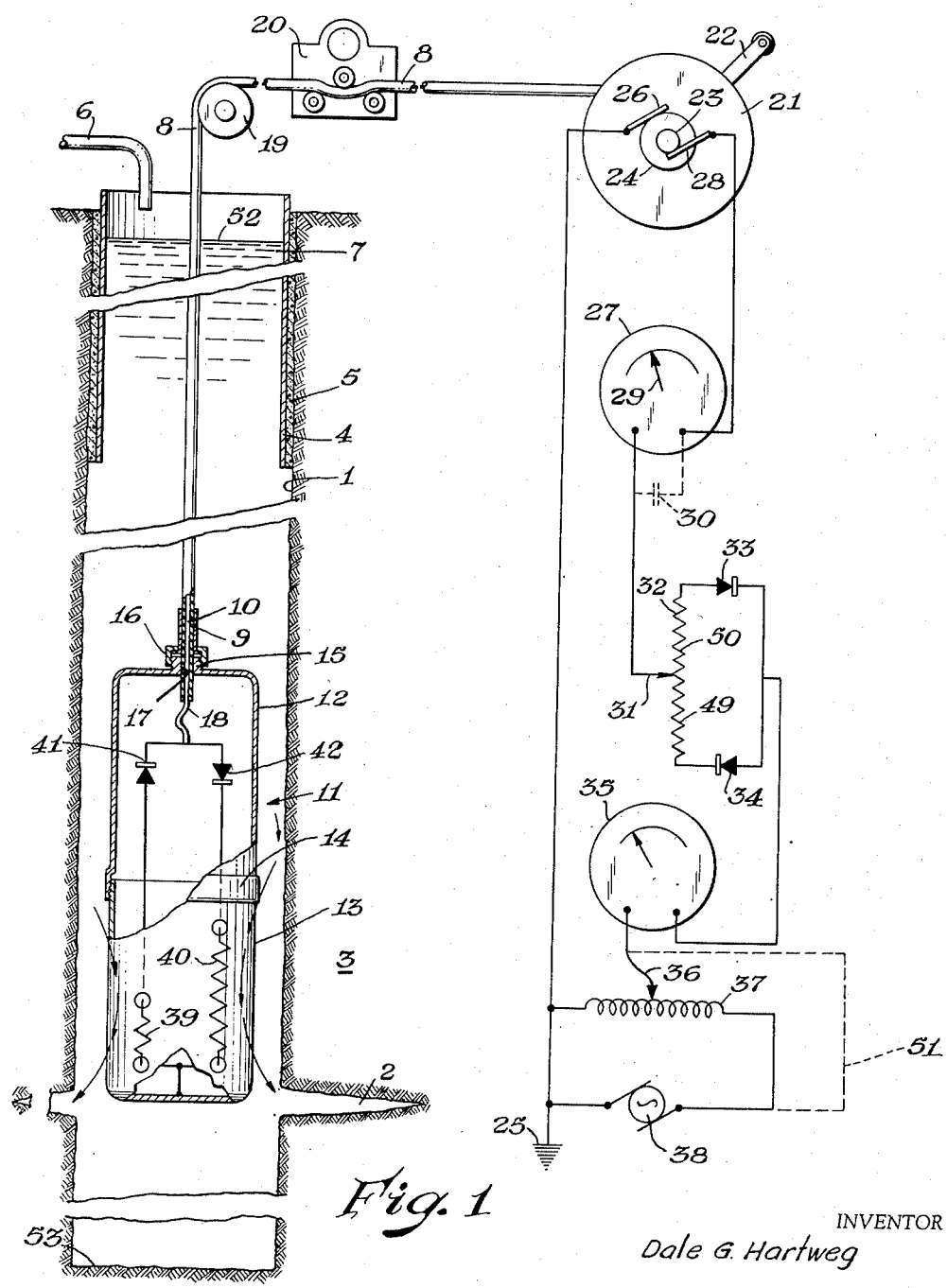

Referring to the drawing in detail, there is shown a well bore 1 traversing a thief zone 2 in an earth formation 3. The upper portion of the bore is provided with a casing 4 cemented in place with the cement sheath 5. A pipe connection 6 is provided for the introduction of a circulation fluid, such as a drilling mud, from a suitable source not shown, to form a mud column 7 in the well. The foregoing well structures are conventional and form no part of the present invention.

Shown suspended in the well bore, on a cable 8, having an external flexible metal sheath 9 and a single central insulated conductor 10, is the subsurface portion of the apparatus of the invention comprising the fluid movement sensing means. This comprises a fluid-tight case 11 which may be made in two separable parts 12 and 13 held together by a fluid-tight coupling 14. The case is adapted to protect the working elements to be contained therein from the well fluids and is made sufficiently strong to resist the high hydrostatic pressures to which it may be subjected in use.

The upper end of the case is provided with an externally threaded boss 15 to which is screwthreadedly secured the cable socket 16 for holding and fluid sealing the cable to the case. The boss is provided with an opening 17 into the case through which the lower end 18 of the insulated conductor extends.

The upper end of the cable may be run over a pulley 19 above the well and threaded through a footage indicator 20 for measuring the length of cable paid out into or withdrawn from the well with the aid of the reel 21 on which the cable may be wound. As shown, the reel is provided with a turning crank 22 and a pair of slip rings 23 and 24, the inner one 23 of which is connected to the insulated conductor 10 of the cable, and the outer one 24 to the cable sheath 9 and may be also connected to ground 25 as indicated in Fig. 1 through the collector brush 26 which rides on slip ring 24.

The surface electrical equipment comprises means to indicate D. C., such as a D. C. milliammeter 27, one terminal of which is connected to the collector brush 28 which rides on slip ring 23. The position of rest of the pointer 29 of milliammeter 27, when there is no current flow through it, is at the center of the scale allowing the pointer to deflect to one side of center for a positive direct current and to the other side for a negative direct current. A condenser 30 having a suitable capacity, such as 500 mfd., may be shunted across the milliammeter as indicated in dotted lines, if desired. The other side of the milliammeter is connected to the slider 31 of a potentiometer 32 or voltage divider. The voltage divider may have a resistance of 100 ohms, for example, from end to end. One end of the potentiometer is connected to the negative terminal of a half-wave rectifier 33, such as a selenium rectifier or vacuum tube rectifier capable of handling up to 400 milliamperes, although rectifiers of other capacities and types may be used. The other end of the potentiometer is connected to the positive terminal of a similar rectifier 34. The positive terminal of rectifier 33 is connected to the negative terminal of rectifier 34 and to one side of an A. C. milliammeter 35. The other side of the milliammeter is connected to a grounded source of adjustable A. C. As shown, this may comprise the slider 36 of an adjustable auto-transformer 37 having one end of its winding connected to ground 25 and the other to one terminal of a suitable A. C. generator 38, such as a 115 volt A. C. 60 cycle generator, the other terminal of which is connected to ground 25.

Figure 3:
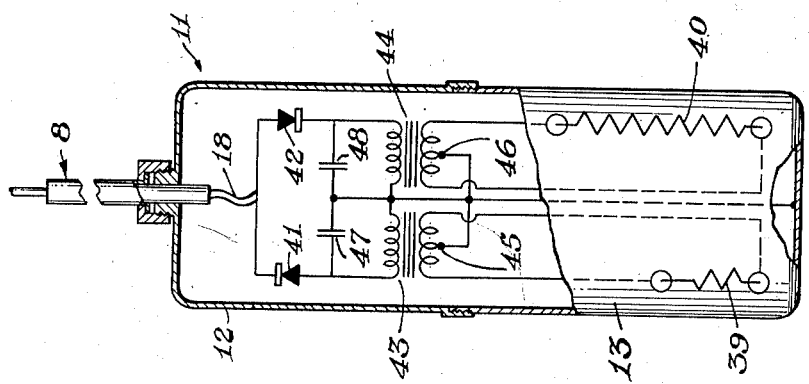
Fig. 3 is a side elevation largely in section of a preferred modification of the subsurface portion of the apparatus of Fig. 1.
Figure 2:
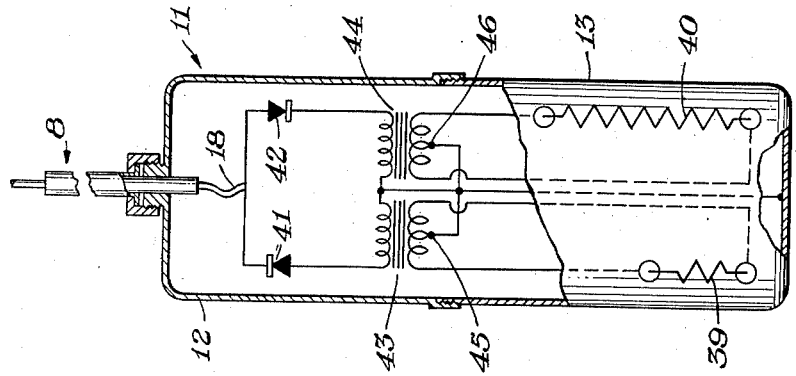
Fig. 2 is a side elevation largely in section of a modification of the subsurface portion of the apparatus of Fig. 1.

Referring to the case 11 of the subsurface portion of the apparatus, there is shown, in each of the three modifications of Figs. 1, 2, and 3, a pair of resistance elements 39 and 40 mounted on and insulated from the case 11 in a position to be contacted by the fluid, the movement of which relative to the resistances is to be detected. These resistances, as already indicated, have unequal heat dissipation characteristics, as by forming them of wires having preferably substantially equal electrical resistances but different surface areas. Equal electrical resistance and unequal heat dissipation may be achieved by making one of them, e. g. 39, of a short thin wire and the other, e. g. 40, of a longer thicker wire. For example, one of them may be 7/8 of an inch of 40 gauge (American wire gauge) and the other 5½ inches of 32 gauge both of nickel wire. Such resistance elements have a resistance of 0.44 ohm each. Resistance wire of other metals and sizes may be used. These resistance elements are mounted preferably parallel to each other and spaced apart preferably at least 0.03 inch on the outer surface of the case. In general, 0.25 inch spacing is satisfactory, although a spacing of up to several inches may be used. Mounted internally of the case 11 is a pair of half-wave rectifiers 41 and 42, preferably of the selenium type. The positive terminal of rectifier 41 is connected to the negative terminal of rectifier 42 and to the lower end 18 of the insulated conductor 10.

In the modification of the subsurface portion of the apparatus shown in Fig. 1, one end of the shorter element, 39, is connected to the negative terminal of rectifier 41 and the other end of the shorter element 39 is grounded on the case 11 and thereby connected to the sheath 9 of the cable. One end of the longer element 40 is connected to the positive terminal of rectifier 42 and the other end is grounded on the case 11 and is thereby also connected to the cable sheath 9.

In the modification shown in Fig. 2, in addition to the pair of half-wave rectifiers 41 and 42, there is included in the case 11 a pair of transformers 43 and 44 by which the rectifiers are coupled to the elements 39 and 40, respectively. The transformers may be similar to the ordinary vacuum tube filament transformers in which the primaries are designed for operation at 115 volt 50–60 cycle A. C. (a frequency corresponding to that of the A. C. source 38) and the secondaries at 2.5 volts, although other transformers may be used. As shown, one of the terminals of the primary side of each of the transformers 43 and 44 is grounded to the case 11. The ungrounded primary terminal of transformer 43 is connected to the negative terminal of the rectifier 41, while the ungrounded primary of the transformer 44 is connected to the positive terminal of the rectifier 42. The secondary of transformer 43 is connected across the shorter element 39 and the secondary of transformer 44 is connected across the longer element 40. The secondaries have center taps 45 and 46, respectively, which are preferably grounded.

In the modification of Fig. 3, the case 11 contains the same rectifiers, 41 and 42, and transformers, 43 and 44, as the modification of Fig. 2 with the addition of condensers 47 and 48 shunted across the primary of each of the transformers 43 and 44, respectively As is manifest from the wiring diagram, when A. C. is supplied to the auto-transformer 37, the rectifiers 33 and 34 allow the positive components or pulses of the A. C. to flow only through one of the branches, e. g. 49, of the potentiometer 32, and the negative component or pulses of the A. C. only through the other branch, e. g. 50. Similarly, the rectifiers 41 and 42 allow only the positive pulses of the A. C. to pass through one of the elements, e. g. 40, and the negative pulses of the A. C. pass only through the other element, e. g. 39. Since the positive and negative pulses of the A. C. follow in quick succession, at a rate determined by the frequency of the A. C. source 38, the pointer 29 merely indicates, in effect, the ratio of the magnitude of one kind of pulse relative to that of the other passing through one branch of the potentiometer 32 relative to the other branch. At the position of rest of the pointer 29, there is either no current flow at all, as aforesaid, or the magnitude of the positive pulses is equal to that of the negative pulses. Should the magnitude of the positive pulses exceed that of the negative ones, the pointer 29 deflects to the right of center to an extent which indicates the magnitude of the ratio between the two kinds of pulses. Similarly, a deflection to the left of center indicates that the magnitude of the negative pulses exceeds that of the positive pulses and the magnitude of the ratio between these two kinds of pulses is indicated by the extent of the deflection to the left from center. It is also manifest that the relative magnitudes which pass the positive and negative pulses through the two branches of the potentiometer are controllable by means of slider 31 which may be moved so as to change the resistance of the branch 50 with respect to that of the branch 49. As a consequence, for a given A. C. input reading on the A. C. milliammeter 35, the D. C. milliammeter 27 can be made to give any desired reading over the whole scale from left to right by an appropriate setting of slider 31. Thus, by setting the slider 31 so that the pointer 29 is at the center of the scale indicating no D. C., the current flow in element 39 is thereby balanced against the current flow in element 40.

In calibrating any of the modifications of the apparatus for use, the fluid movement sensing (subsurface) portion of the apparatus comprising case 11 is submerged in a motionless fluid, such as a still column of drilling mud, so as to bring the elements 39 and 40 into contact with the fluid. A. C. is supplied to the auto-transformer 37 and slider 36 is then moved to a position in which the A. C. milliammeter 35 shows a deflection corresponding to about 75 per cent of its full scale reading. Slider 31 is moved until a position is found at which the D. C. milliammeter pointer 29 moves to the extreme left of the scale. In this position, once the sliders 31 and 36 have been set, as described, and the elements 39 and 40 are in contact with the motionless ambient fluid, the extreme left reading of the D. C. milliammeter is taken as indicating absence of fluid flow relative to the elements 39 and 40. The next step in the calibration is to move the case 11 of the apparatus relative to the ambient fluid at a known rate, such as 100 feet per minute. This causes the temperature of the elements 39 and 40 to decrease, the one relatively more than the other and, therefore, the resistance of the one decreases relatively more than that of the other. As a consequence, the ratio of the magnitude of the positive pulses to that of the negative ones is increased and this is evidenced by the pointer 29 moving to a position toward the right of the beginning, or extreme left, of the scale. The slider 36 is then further adjusted, while the case 11 of the apparatus is moved relatively to the ambient fluid at the aforesaid known rate, until a position for slider 36 is found at which the pointer 29 moves to the extreme right end of the scale.

It will be also evident that when the ambient fluid is not moving with respect to the subsurface portion of the apparatus, the D. C. milliammeter pointer will remain stationary for any given setting of the slider 31, and that, if the resistances of elements 39 and 40 change equally at the same time, as when their temperatures simultaneously change an equal amount, the D. C. milliammeter 27 will show no change in current while there will be a change in the reading of the milliammeter 35 corresponding to the increase or decrease in A. C. input which results from the decrease or increase respectively of the temperature of the two resistance elements, 39 and 40. By the foregoing calibration, it is thus apparent that the movement of fluid relative to the two elements, 39 and 40, is detected as a change in the D. C. milliammeter reading and a change in temperature of the ambient fluid not accompanied by movement of the ambient fluid with respect to the subsurface apparatus will be detected as a change in the A. C. milliammeter reading without a significant change in the D. C. milliammeter reading.

It will be apparent to those skilled in the art that various modifications may be made in the apparatus without departing from the scope of the invention as defined in the appended claims. For instance, the adjustable auto-transformer 37 may be omitted and the A. C. source 38 connected directly to the A. C. milliammeter 35, as indicated by the dotted line 51. The source 38 of A. C. itself could be adjustable as to the voltage and current of its output. Control of the A. C. output from the source also could be effected with a rheostat (not shown) which could be included in the lead 51.

In locating a thief zone, e. g. 2 in Fig. 1, the calibrated subsurface portion of the apparatus, i. e. that comprising case 11 in any of its modifications, is lowered into the well having a fluid column therein, e. g. drilling mud 7, the top 52 of which is maintained constant as to elevation by introducing mud fluid through pipe 6 at a suitable constant rate. On reaching the bottom 53 of the bore of the well, the D. C. milliammeter will deflect to the extreme left indicating thereby that there is no fluid flow relative to elements 39 and 40. The case 11 is then raised a short distance in the mud column while keeping a record of the depth of the case by means of the footage indicator 20. The reading of the D. C. milliammeter is noted at the new depth, and, if substantially different from that at the bottom, this is an indication that a thief zone has been encountered. In Fig. 1, for example, the case 11 is shown raised off the bottom 53 to an elevation at which mud fluid from the mud column 7 is flowing downwardly past the elements 39 and 40 into thief zone 2, as indicated by the arrows, thereby changing the temperature, and, therefore, the resistance of element 40 more than that of 39. As a consequence, the previous balance of the circuits for the positive pulses of the A. C. and the negative pulses of the A. C. is upset, the upset revealing itself as a D. C. reading on the milliammeter 27. Thus, by raising the case 11 a short distance at a time, noting the reading of the D. C. milliammeter at each elevation to which the case is raised, and held at a specific elevation, the elevation at which the flow of the mud fluid past the case changes is ascertained, thereby revealing the elevation of a thief zone.

I claim:

1. An apparatus for detecting the movement of fluid in a well hole comprising a fluid-tight case adapted to be positioned in a column of fluid in the well; a cable for suspending the case in the well, said cable comprising a single insulated conductor and a metallic sheath therefor; two thermally sensitive electrical resistance heating elements one having a greater surface area than the other mounted on and insulated from the case in position to be contacted by the fluid of the column whereby a flow of fluid past the heating elements changes the temperature and consequently the electrical resistance of one more than the other; means for supplying heating current to each of the heating elements through the said insulated conductor, said means for supplying heating current comprising an above ground source of A. C. and half-wave rectifier means both above ground and in the case for directing the positive pulses of the A. C. through only one of the two heating elements and the negative pulses only through the other; a voltage divider having its end terminals connected with the above ground one-half wave rectifier means and its movable terminal connected to the rectifier means in the case, said voltage divider being capable of changing the ratio of the magnitude of the positive pulses to the magnitude of the negative pulses to a predetermined value whereby a change in the ratio is indicative of a greater change of resistance of one of the two heating elements compared to that of the other; and D. C. current measuring means connected in series with the said movable terminal and the half-wave rectifier means in the case for indicating the said ratio.

2. An apparatus for detecting the movement of fluid in a well hole comprising a fluid-tight case adapted to be positioned in a column of fluid in the well; a cable for suspending the case in the well, said cable comprising a single insulated conductor and a metallic sheath therefor; a reel for the cable, one end of the cable being wound on the reel and the other secured to the case with the metallic sheath connected to the case and the insulated conductor extending into the case; two thermally sensitive electrical resistance heating elements one having a greater surface area than the other mounted on and insulated from the case in position to be contacted by the fluid of the column; means for supplying heating current to each heating element through the said insulated conductor, said means for supplying heating current comprising an above ground source of A. C. and half-wave rectifier means both above ground and in the case for directing the positive pulses of the A. C. through only one of the two heating elements and the negative pulses only through the other; a voltage divider having its end terminals associated with the above ground one-half wave rectifier means and its movable terminal connected to the rectifier means in the case, said voltage divider being capable of changing the ratio of the magnitude of the positive pulses to the magnitude of the negative pulses to a predetermined value whereby a change in the ratio is indicative of a greater change of resistance of one of the two heating elements compared to that of the other; D. C. current measuring means connected in series with the said movable terminal and the half-wave rectifier means in the case for indicating the said ratio; and A. C. current measuring means connected in series with the source of A. C. and the first pair of half-wave rectifiers for indicating the magnitude of the A. C. supplied.

3. Apparatus for detecting the movement of fluid in a well hole comprising an above ground source of single phase A. C., having means for adjusting its magnitude; a first pair of half-wave rectifiers, the positive terminal of one of them being connected to the negative terminal of the other and to the input source of A. C. so as to separate the positive and negative pulses of said A. C.; a potentiometer means having one end connected to the output of one of the said pair of rectifiers and the other end connected to the output of the other rectifier, the potentiometer means having an adjustable contact intermediate its ends so as to permit adjustment of the magnitude of the positive pulses of the A. C. relative to that of the negative pulses of the A. C.; a fluid-tight case adapted to be lowered into the fluid in the well; two temperature sensitive electrical resistances one having a greater surface area than the other mounted in space relation to each other on and insulated from the case; a second pair of half-wave rectifiers, said second pair being mounted within the case; a cable means for suspending the case in the well comprising a single insulated conductor and metallic sheath therefor, said case being secured to one end of the cable and connected to the sheath, the insulated conductor having one end terminating inside the case and connected to the said second pair of rectifiers and the other end above ground and connected to the adjustable contact of the said potentiometer, the said second pair of rectifiers being coupled to the said resistors so as to permit pulses of only one polarity to reach one of the electrical resistances and pulses of the opposite polarity to reach only the other of the electrical resistances; a direct current measuring means connected in series with the single insulated conductor for indicating the ratio of the magnitude of the positive and negative pulses traversing the conductor; and alternating current measuring means connected in series with the source of A. C. and the first pair of half-wave rectifiers for measuring the magnitude of the A. C. fed to the first pair of rectifiers.

DALE G. HARTWEG.

References Cited in the file of this patent
UNITED STATES PATENTS

| Number | Name | Date |
|---|---|---|
| 2,524,150 | Vincent | Oct. 3, 1950 |
| 2,580,182 | Morgan et al. | Dec. 25, 1951 |